United States Patent [19]

Thompson

[11] 4,336,010

[45] Jun. 22, 1982

[54] DOUGH FORMING, DIVIDING AND CUTTING APPARATUS

[76] Inventor: Daniel T. Thompson, 1141 Napoli Dr., Pacific Palisades, Calif. 90272

[21] Appl. No.: 183,187

[22] Filed: Sep. 2, 1980

[51] Int. Cl.³ .................. B29C 15/00; A21C 5/00
[52] U.S. Cl. .................. 425/141; 425/145; 425/296; 425/298; 425/301; 425/302.1; 425/304; 425/307; 425/308; 425/310
[58] Field of Search ............ 425/193, 194, 238, 296, 425/301, 302.1, 324.1, 335, 337, 363, 364, 304, 135, 140–142, 145, 310, 335, 303, 298, 306, 307, 308, 313; 264/40.7, 138, 146; 426/503, 502, 496, 512, 391; 83/72, 77, 302, 311

[56] References Cited

U.S. PATENT DOCUMENTS

| | | |
|---|---|---|
| Re. 25,536 | 3/1964 | Thompson .................. 425/287 |
| 543,504 | 7/1895 | Pfenninger ................. 425/308 |
| 644,810 | 3/1900 | Sylvester .................. 425/308 |
| 782,977 | 2/1905 | Madden ..................... 83/345 |
| 1,204,477 | 11/1916 | Nicholson ................. 425/304 |
| 1,839,180 | 12/1931 | Bergner .................... 425/287 |
| 2,126,416 | 8/1938 | Schlichter ................. 425/288 |
| 2,566,854 | 9/1951 | Rhodes ..................... 264/40.7 |
| 2,598,820 | 6/1952 | Neese ...................... 83/302 |
| 2,779,298 | 1/1957 | Chwirut et al. ............. 425/325 |
| 3,052,196 | 9/1962 | Gilmore .................... 425/288 |
| 3,212,461 | 10/1965 | Fritzberg .................. 425/142 |
| 3,250,834 | 5/1966 | Collins .................... 425/308 |
| 3,264,682 | 8/1966 | Freeman .................... 264/40.7 |
| 3,311,947 | 4/1967 | Fenley ..................... 425/141 |
| 3,347,960 | 10/1967 | Fenley ..................... 425/141 |
| 3,379,142 | 4/1968 | Reiter et al. .............. 425/288 |
| 3,433,182 | 3/1969 | Thompson ................... 425/287 |
| 3,452,687 | 7/1969 | Kaneko et al. .............. 425/288 |
| 3,496,820 | 2/1970 | Utzman et al. .............. 83/302 |
| 3,517,622 | 6/1970 | Schneider .................. 425/288 |
| 3,600,247 | 8/1971 | McCarty .................... 425/141 |
| 3,792,940 | 2/1974 | Thompson ................... 425/296 |
| 4,045,151 | 8/1977 | Zazzara .................... 425/313 |
| 4,147,809 | 4/1979 | Thompson ................... 426/499 |
| 4,202,229 | 5/1980 | Feldkämper ................. 83/327 |
| 4,218,207 | 8/1980 | Thompson ................... 425/241 |
| 4,224,848 | 9/1980 | Beerenwinkel ............... 83/76 |

FOREIGN PATENT DOCUMENTS

| | | |
|---|---|---|
| 823694 | 7/1949 | Fed. Rep. of Germany ........ 83/345 |
| 2505221 | 8/1976 | Fed. Rep. of Germany ...... 425/141 |
| 239890 | 8/1969 | U.S.S.R. .................. 425/296 |

Primary Examiner—Willard E. Hoag
Attorney, Agent, or Firm—Poms, Smith, Lande & Rose

[57] ABSTRACT

An apparatus produces a continuous plurality of generally rectangular dough elements of a controllable weight from a continuous and irregular mass of dough. The invention includes separate forming, dividing, and cutting portions. The forming portion includes multiple rollers disposed both normal to as well as parallel and traverse to the path of movement of the dough which form the irregularly-shaped dough mass to have a uniform width, depth, and consistency. The dividing portion includes a horizontally-disposed, multichannel dividing drum and a plurality of compression rollers which divide the dough from the forming portion into multiple strips of uniform cross section. The cutting portion includes a multiblade assembly having the shape of and being occludable with the channels of the multichannel drum. The blades are driven at constant speed in a planetary fashion whereby the only motions of the blades relative to the strips of dough passing through multichannel drum are inward and outward. The strips of dough are thus divided into a plurality of generally rectangular dough elements with a minimum of dough working or punishment. The weight of the dough elements is determined by the rotational speed of the dividing drum. Cooperating with the forming and dividing portions is a sensing mechanism which senses the amount of dough between the forming and dividing portions. The sensing mechanism controls the rotational speed of the horizontal rollers in the forming portion to maintain a predetermined amount of dough adjacent the compression rollers to assure uniform compression of the dough.

12 Claims, 19 Drawing Figures

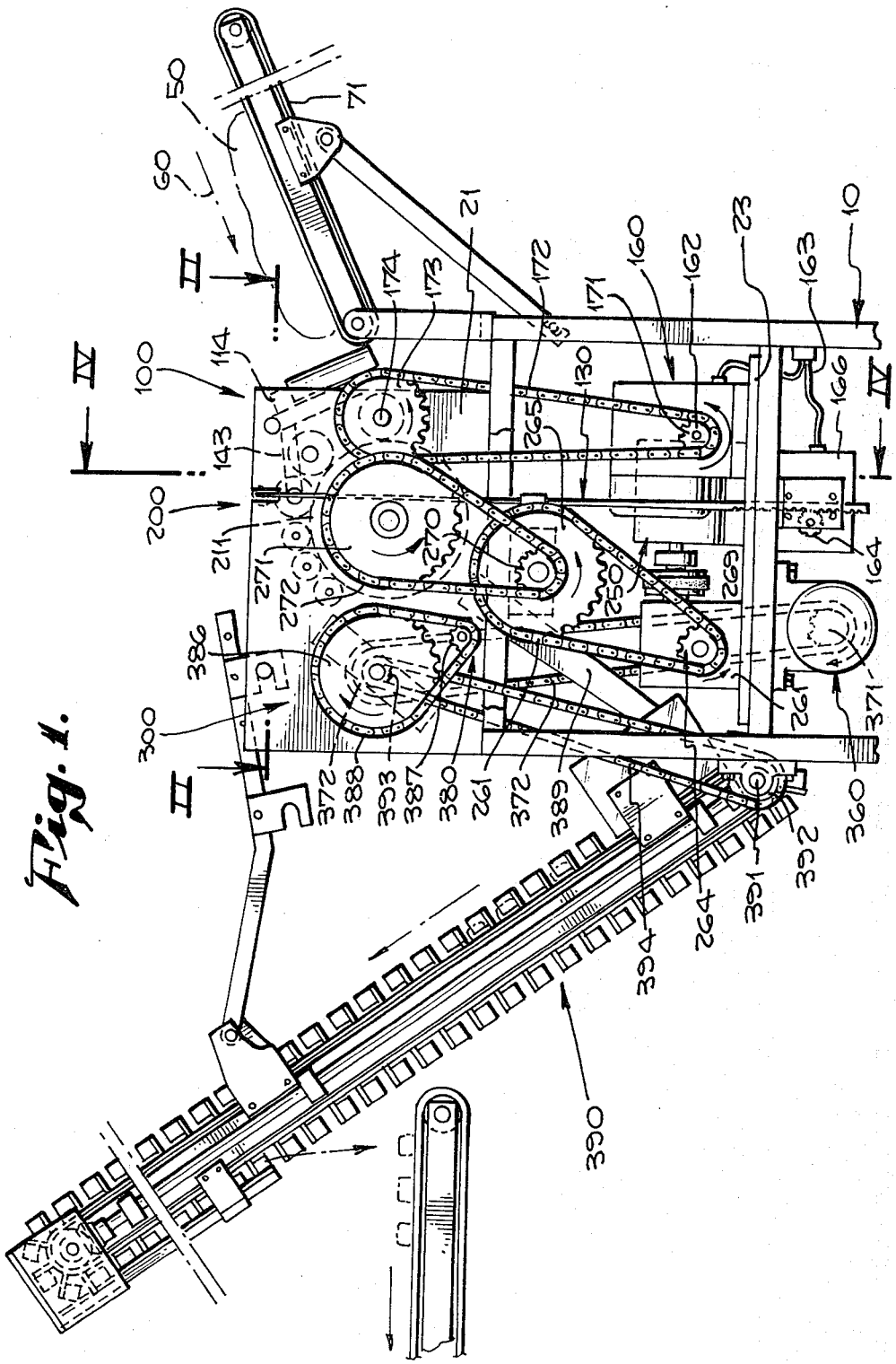

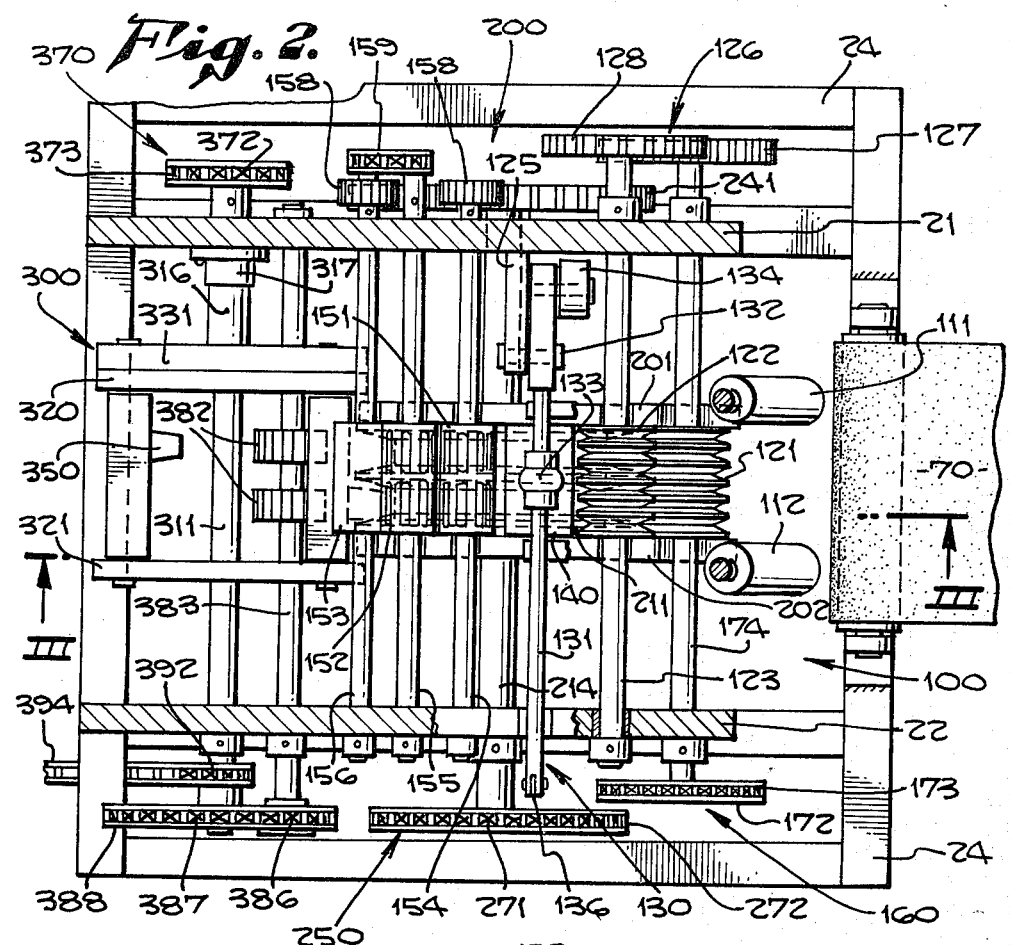
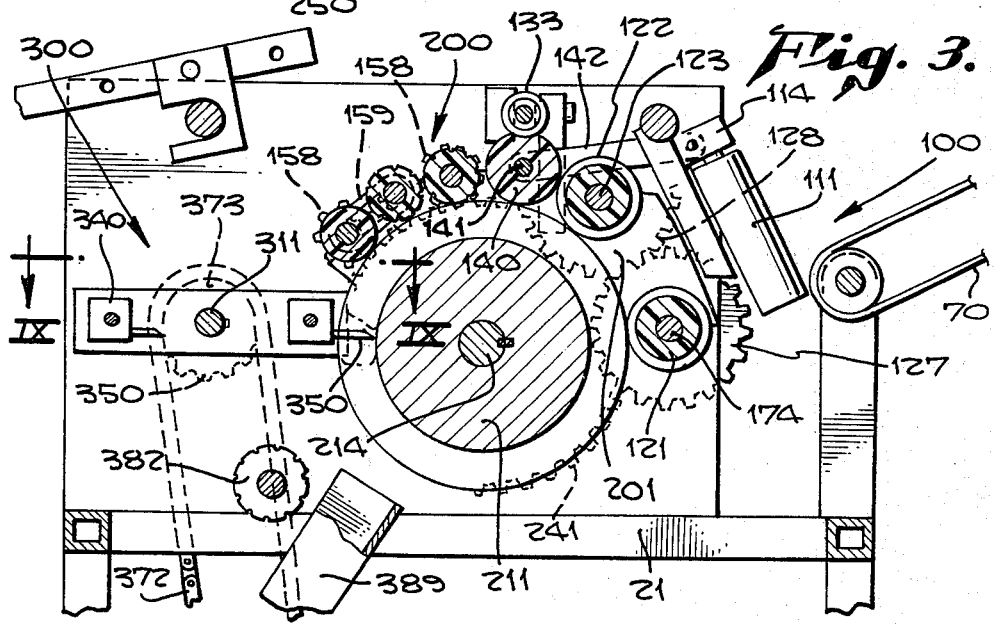

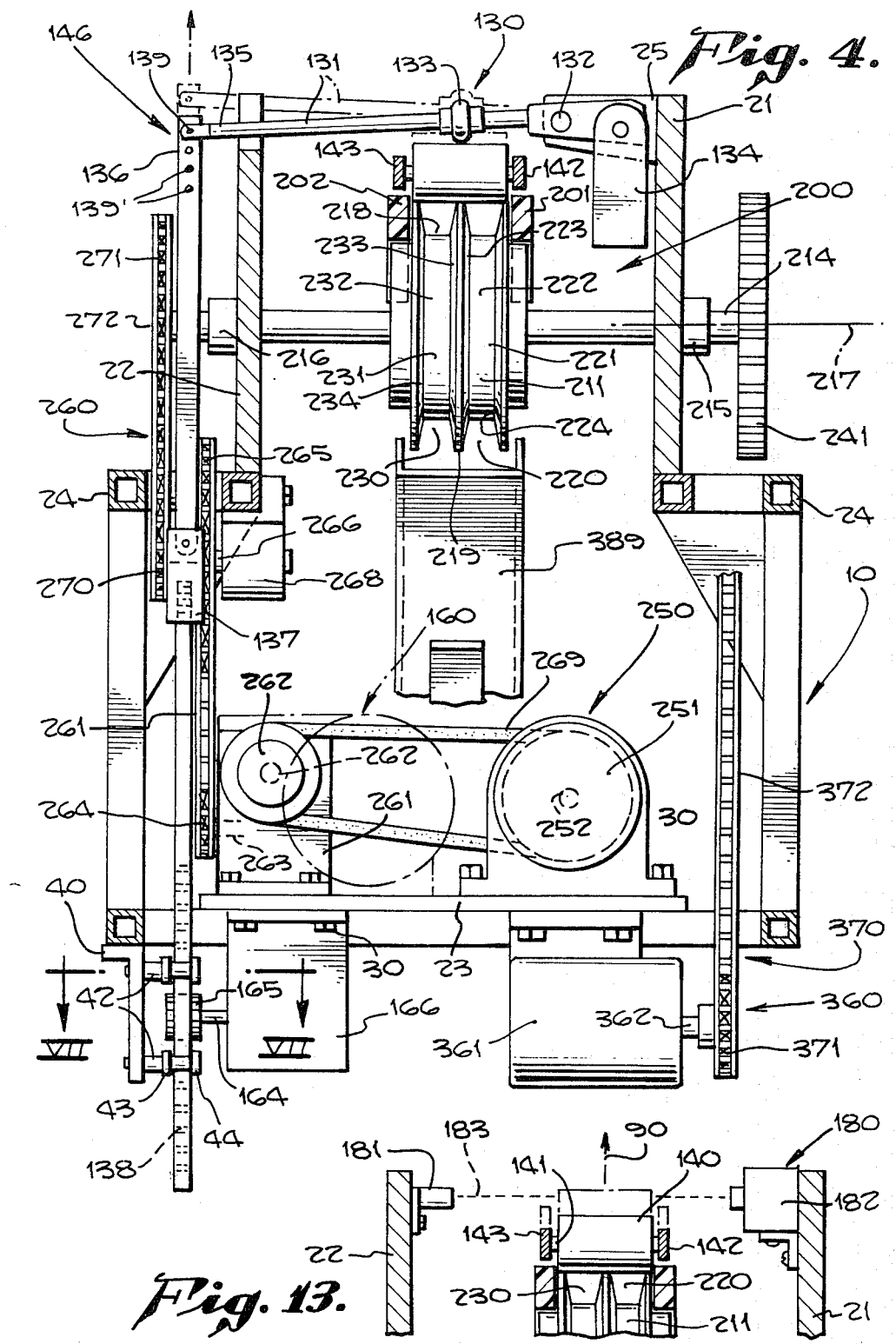

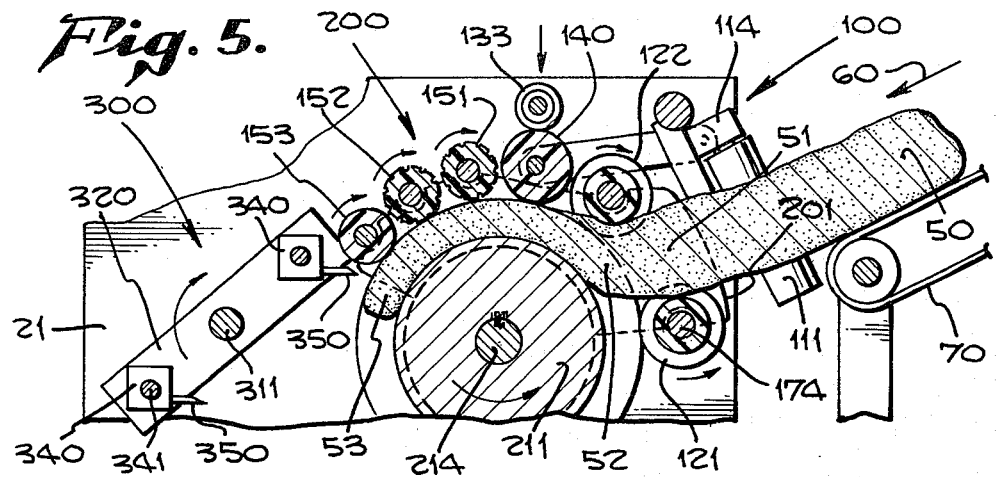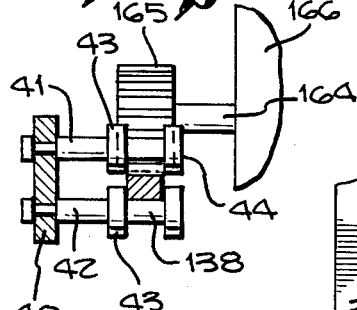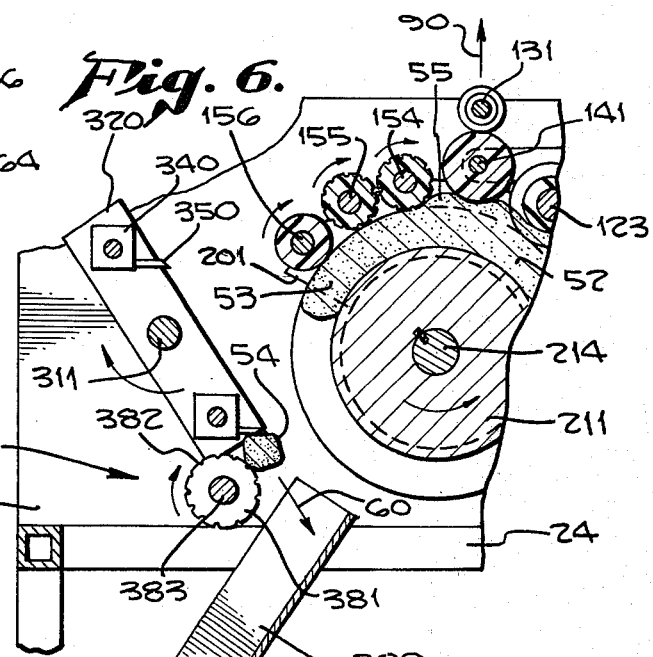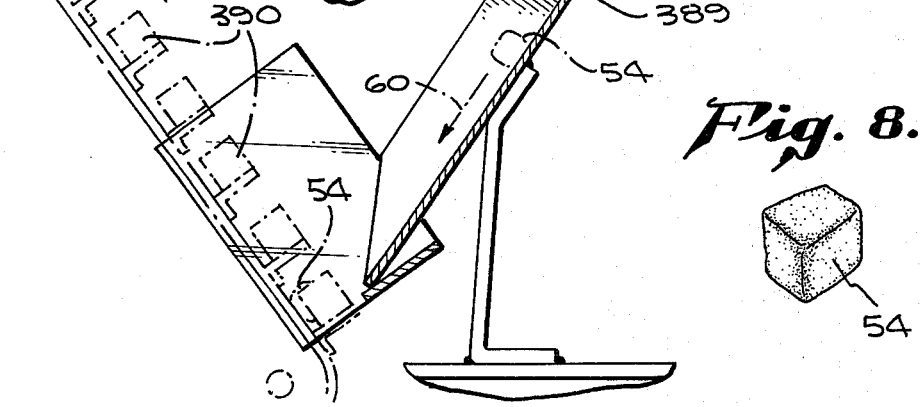

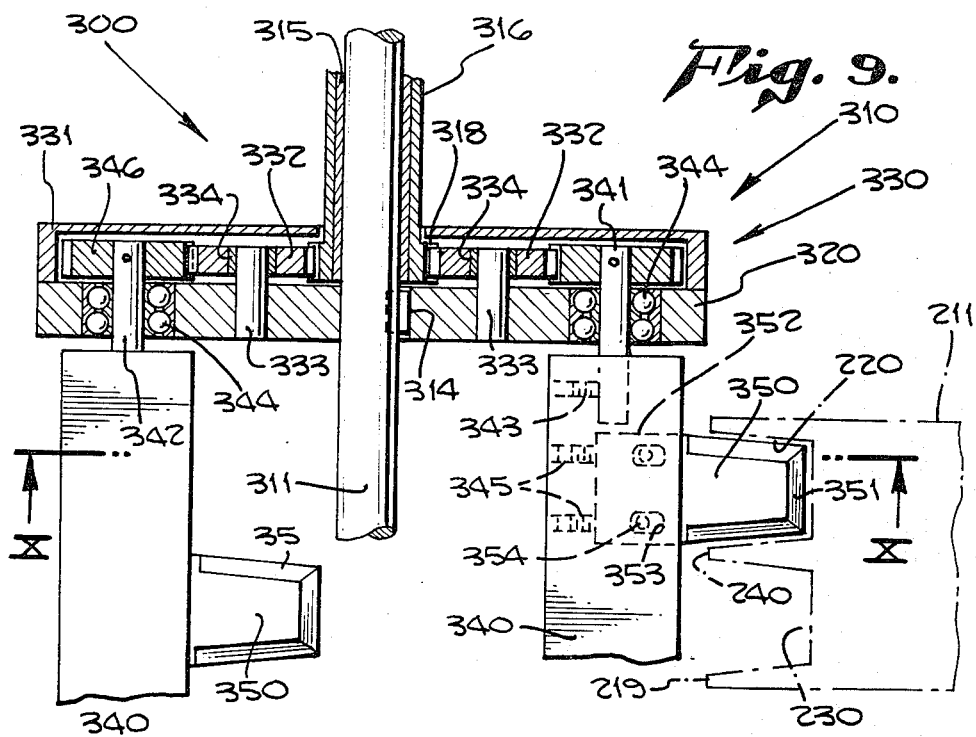
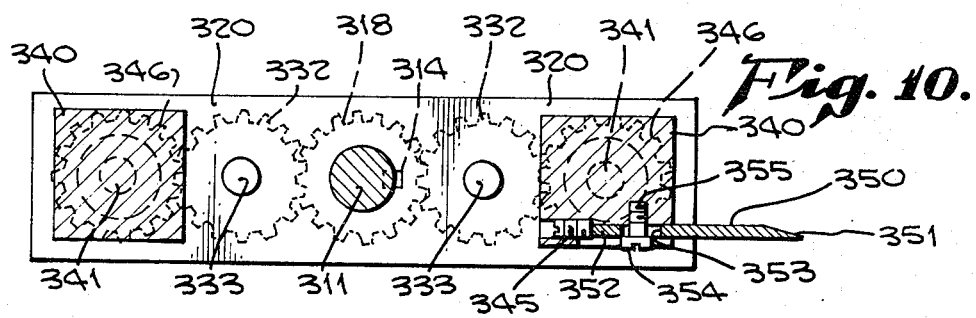
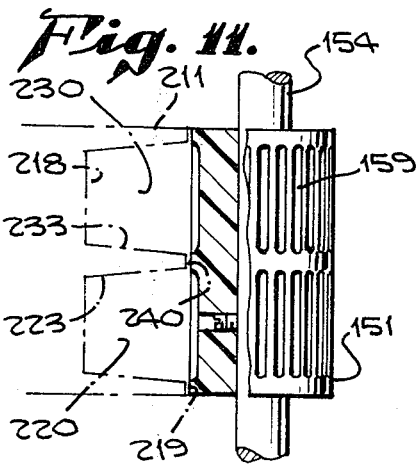
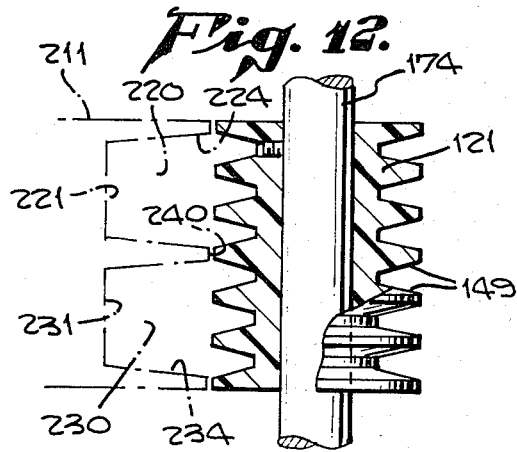

DOUGH FORMING, DIVIDING AND CUTTING APPARATUS

FIELD OF THE INVENTION

This invention relates generally to the forming, dividing and cutting of dough, and specifically to the dividing and forming of a non-uniformly shaped bulk of dough into continuous strips of uniform cross-section and the subsequent cutting of the strips into discrete dough elements of a uniform and controllable weight with a minimum of dough working.

BACKGROUND OF THE INVENTION

This apparatus is intended to be compatible with the dough shaping apparatus disclosed in the copending application entitled IMPROVED SPHEROID-FORMING DOUGH-SHAPING APPARATUS, by the inventor of this invention, as well as other dough shaping devices as are known in the art and typified by the device disclosed in U.S. Pat. No. 3,433,182, AUTOMATIC FEEDING CUT-OFF AND BAGEL-FORMING MACHINE issued Mar. 18, 1969 also by the inventor this invention. Each of these devices provide means for the shaping of rectangular solid chunks of dough into desired shapes of finished dough product, specifically spheroids and toroids.

Of primary concern in the design of dough shaping, dividing and cutting devices in the minimization of dough working and punishment. As exemplified in the prior art devices, such working or punishment is caused by the compressive and shear stresses imparted to the dough during the shaping, dividing, and cutting processes. These forces tend to produce excessive nonuniform plastic deformation of the dough in excess of that ordinarily necessary to form the dough to the desired shape. This excess deformation produces frictional heat which causes premature rising of the dough, resulting in a tougher finished product as well as nonuniformity due to selective working of different portions of the dough product. It is thus desirable to minimize dough working or punishment.

The prior art devices also utilize dough shaping and cutting operations wherein whereby a nonuniform bulk of dough is compressed between pairs of compression rollers to a uniform thickness and then cut into generally rectangular solids by a transversely moving cut-off blade having no component of motion in the direction of motion of the dough. This motion of the cutting blade causes dough to temporarily accumulate behind the blade as the dough continues to feed dough toward the blade. Thus, the dough undergoes undesirable compressive deformation by the blade.

These devices also have no means for controlling the infeeding of the dough which, unless controlled, can produce excessive longitudinal deformation of the dough.

Another prior apparatus is disclosed in U.S. Pat. No. 3,792,940, EASILY CLEANED BAGEL-FORMING MACHINE, issued Feb. 19, 1974, also to the inventor of the present invention. This patent teaches the use of a circular knife on a forming roller for the purpose of dividing a wide bulk strip of dough into narrower strips for subsequent cutting and shaping. This apparatus adequately accomplishes the dividing function with a minimum of working, but is limited to dividing a uniform batch of dough into two or three strips as divergent paths are required subsequent to the dividing blade to prevent the divided strips from readhering to each other. More than three divergent paths would cause unnecessary working of the dough as the path of each strip must more severely bend away from the others. It would thus be desireable to provide more than three strips of dough, as that would allow a faster production rate of the dough elements.

Accordingly, it is the primary object of the present invention to minimize dough working in a dough forming, cutting and shaping apparatus.

It is another object of the present invention to provide a uniform volume of dough while preventing buildup of dough to minimize compression of the dough.

It is a further object of the present invention to produce multiple strips of dough of a uniform cross-section with a dough dividing and shaping means that minimizes dough working and which is expandable to produce additional strips without an increase in dough working.

It is yet another object of the present invention to cut dough strips with a blade having a component of motion in the direction of travel of the dough to prevent dough build up behind the blade and to prevent the deformation caused thereby.

It is a still further object of the present invention to feed dough to a forming, dividing and cutting apparatus without excessive longitudinal dough deformation.

It is also an object of the present invention to produce a generally rectangular solid of dough product having a uniform and predetermined weight, volume and dimension which is usuable by spheroidal or toroidal dough forming devices.

It is yet a further object of the present invention provide a dough forming, dividing, and cutting apparatus in which the volume and shape of the resulting rectangular dough product is easily adjustable.

SUMMARY OF THE INVENTION

The present invention, in a broad aspect, provides an apparatus that produces a continuous plurality of generally rectangular dough members of a uniform and controllable weight from a continuous and irregular mass of dough. The invention includes separate forming, dividing, and cutting portions. The forming portion includes multiple vertically inclined and horizontal rollers which form the irregularly-shaped dough mass to have a uniform width, depth, and consistency. After passing through the forming portion, the dough passes to the dividing portion, which includes a horizontally-disposed, multichannel dividing drum and a plurality of compression rollers which divide the dough into multiple strips of uniform cross section. Cooperating with the forming and dividing portions is a sensing mechanism which maintains a constant and preselected amount of dough between the dough forming and dough dividing portions of the apparatus to assure uniform compression of the dough by the dividing portion. The sensor increases or decreases the rotational speed of the horizontal rollers in the forming portion to maintain the desired amount of dough.

After passing through the multichannel drum, the dough is cut by the cutting portion of the apparatus. The cutting portion includes a multiblade assembly having the shape of and being occludable with the channels of the multichannel drum. The blades are driven at a constant speed in a planetary fashion whereby the only motion of the blades relative to the strips of dough passing through the multichannel drum are inward and outward. Accordingly, the strips of dough are divided into a plurality of generally rectangular dough elements with a minimum of dough working or punishment. The weight of the dough elements is determined by the rotating speed of the multichannel drum.

In accordance with another feature of the invention, the multichannel drum and cutting assembly can be assembled with a different number of channels and blades in accordance with the desired speed of production of the dough elements.

In accordance with a further feature of the invention, the forming portion of the apparatus utilizes a pair of vertically disposed rollers and a pair of horizontally-disposed rollers having a plurality of circumferential grooves. The vertical rollers form the nonuniform continuous dough mass to have a uniform width. The multigrooved horizontal rollers receive the dough from the vertical rollers and establish a uniform thickness for the dough, with the circumferential grooves creating a wedging effect to establish a greater surface contact between the roller and the dough than would be possible with a smooth roller.

In accordance with yet another feature of the invention, the novel apparatus of the present invention does not utilize any of the reciproval motion characterizing the machines of the prior art. All motion in the present apparatus is rotary, and does not entail any metal-to-metal contact. Accordingly, the required maintenance on the machine is very minimal and the maintenance can be very easily made.

Other objects, features, and advantages of the present invention will become apparent from a consideration of the following detailed description and from the accompanying drawings.

BRIEF DESCRIPTION OF THE DRAWINGS

FIG. 1 is a side view of a dough forming, dividing, and cutting apparatus according to the present invention;

FIG. 2 is a view of the apparatus of FIG. 1 taken through the plane II—II;

FIG. 3 is a sectional view of the apparatus of FIG. 2, taken through the plane III—III;

FIG. 4 is an end view of the apparatus of FIG. 1, taken through the plane IV—IV;

FIG. 5 is an detail view of the apparatus of FIG. 1, showing the forming and dividing of bulk dough;

FIG. 6 is another detail view of the apparatus of FIG. 1, showing the cutting of divided dough into a plurality of dough elements;

FIG. 7 is a sectional view of the apparatus of FIG. 4, taken through the plane VII—VII;

FIG. 8 is a perspective view of the dough elements of FIG. 7;

FIG. 9 is a sectional view of the apparatus of FIG. 8, taken through the plane IX—IX;

FIG. 10 is a sectional side view of the apparatus of FIG. 9, taken in section through plane X—X;

FIG. 11 is an enlarged partially cut-away top view of the compression roller portion of the apparatus of FIG. 1;

FIG. 12 is an enlarged partially cut-away top view of the dividing roller portion of the apparatus of FIG. 1;

FIG. 13 is a sectional view of an alternative embodiment of a portion of the apparatus of FIG. 1, taken through the plane IV—IV;

DETAILED DESCRIPTION

Figure 14:
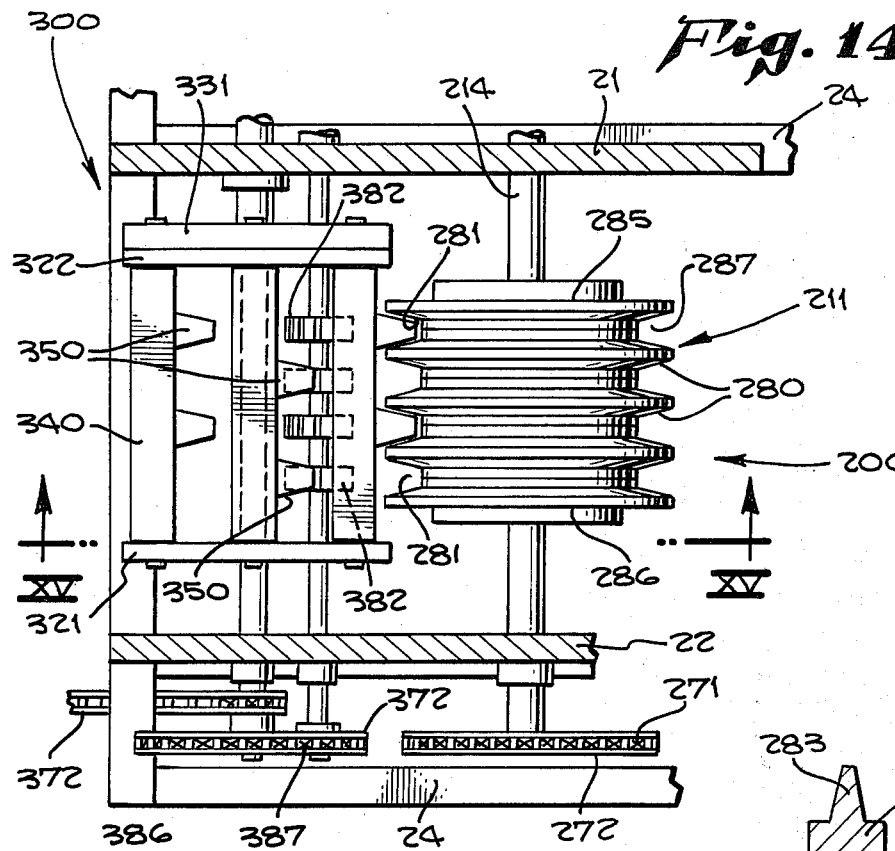
FIG. 14 is a plan view of an alternative embodiment of another portion of the apparatus of FIG. 1.
Figure 15:
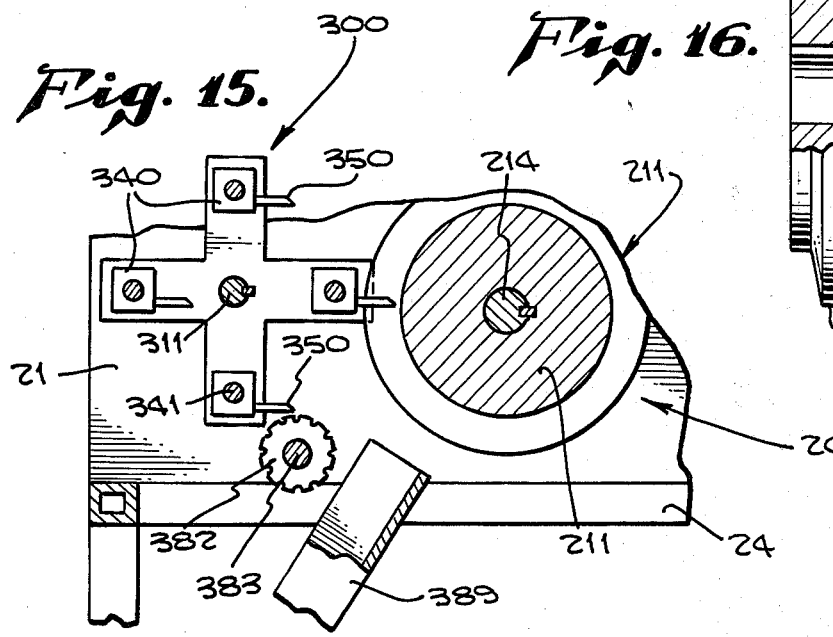
FIG. 15 is a sectional view of the apparatus of FIG. 14, taken through the plane XV—XV.
Figure 16:
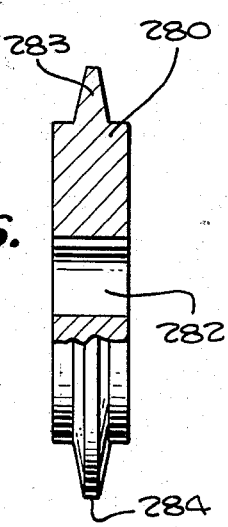
FIG. 16 is a partially cut-away view of a portion of the apparatus of FIGS. 1 and 14.

Referring to FIGS. 1-4, an apparatus according to the present invention is provided for the forming, dividing, and cutting of a bulk of dough into multiple cubic or rectangular elements of a predetermined weight, volume, and dimension. The apparatus includes three interdependent portions. The first or forming portion 100 forms an irregular bulk of plastically deformable substance, such as dough 50, into a continuous slab of uniform width and uniform depth, as generally indicated at 51 and 52 of FIG. 5. The second, or dividing portion 200 divides the slab 52 into multiple strips 53 of dough having uniform cross-sectional dimension. The third or cutting portion 300, cuts the strips of dough 53 into multiple rectangular or cubic elements of uniform weight 54, as slso shown in FIG. 5. These three portions 100, 200 and 300 of the apparatus accomplish their respective forming, dividing and cutting functions with a minimum of dough working or punishment.

The three portions are mounted to a frame 10 which includes various interconnecting support structure 24 forming a rigid chassis which supports first and second frame side walls 21 and 22 and floor 23. Multiple mounting means 30 as are known in the art are utilized for mounting the various portions of the apparatus to the frame 10.

The three portions of the machine are in detail as follows:

1. The Forming Portion

Dough 50 is supplied to the forming portion by conveyor 70. This dough 50 is formed to a slab 51 of uniform width by a pair of freely-rotating rollers 111 and 112, normal to the surface of the conveyor 70 transporting the dough 50 and which are journaled to frame 10 by appropriate means 113 and 114, respectively. After passing through the rollers 111 and 112, the uniform-width slab 51 passes through a pair of horizontal dough infeed rollers 121 and 122, which form the slab 51 to have a uniform thickness and consistency as shown at 52. The lower and upper rollers 121 and 122 are attached to shafts 174 and 123. The shafts 174 and 123 are provided with meshing gear means 126. The lower shaft 174 is provided with a gear 172 driven by a motor means whereby rotation of lower shaft 74 causes rotation of the upper shaft 123. In this manner, the horizontal rollers 121 and 122 have a coordinated infeed rolling motion which transports bulk dough 50 with a minimum of working and forms the dough into a slab of uniform width and depth 52. The horizontal rollers 121 and 122 are provided with grooves 149 extending circumferentially thereabout to improve the gripping by the rollers 121 and 122 of the dough 50.

Dough working is minimized in the present invention by reducing the amount of compression experienced by dough during the forming process. In this regard, a sensor means 130 is provided to maintain a uniform amount of dough between the horizontal rollers 121 and 122 and the dividing drum 211. By maintaining this uniform amount of dough adjacent the dividing drum 211, uniform compression of the dough in the drum is assured. The sensor means 130 controls the operating speed of the rollers 121 and 122 to control the dough accumulation between the horizontal rollers 121 and 122 and the dividing drum.

The sensor means 130 includes a floating roller 140 rotatably mounted to a shaft 141 attached to arms 142 and 143 pivotally mounted to the apparatus frame. The shaft 141 has a substantially vertically upward and downward motion relative to frame 10, corresponding to a radially outward motion of the roller 140 relative to dividing drum 211 in response to dough accumulation and dissipation. An arm 131 pivotally attached to the frame 10 by a pivot 132 extends across the roller 140 and rotatably positions a roller follower 133 at the lateral midpoint thereof. The free end 135 of lever arm 131 has a magnified upward and downward motion relative to frame 10 in response to upward and downward displacement of roller follower 133 in response to accumulation and dissipation of dough past the horizontal rollers 121 and 122. To enhance the operation of the mechanism, the lever arm 131 is provided with a counterweight 134 at the end opposite free end 135. The counterweight 134 minimizes the downward forces exerted by the follower 133 to the sensor roller 140 by producing a countermoment to the moment created by the mass of the lever arm 131 and an arm 136 to which it is attached.

The sensor means 130 assures a uniform accumulation of dough adjacent the dividing drum 211 by controlling the rotational speed of the horizontal rollers 121 and 122, as transferred from a motor means 160. The motor 160 drives a shaft 162 supporting a sprocket 171 coupled via a chain 172 to a sprocket 173 attached to the upper horizontal roller 121. The gear means 126 transfers the rotary motion of the lower horizontal roller 121 to the upper roller 122.

A potentiometer 166 mounted to the apparatus floor 23 has a shaft 164 connected to the motor 160 by electrical connecting means 163 such that rotation of shaft 164 of the potentiometer 166 produces variation in the amount of electrical power supplied to motor 160 by the connecting means 163, resulting in a change in the motor speed and thus of the speed of the rollers 121 and 122. The potentiometer shaft 164 is connected to the sensor means 130 by a linkage 146. The sensor linkage 146 includes an arm 136 pivotally attached to the free end 135 of the arm 131 by a linkage pivot 139, which is insertable into one of a plurality of holes 139' to control the speed of the infeed rollers 121 and 122. This linkage 146 also has a length adjusting means 137 and a linking arm rack 138 integral therewith. The shaft 164 of potentiometer 166 fixedly carries a pinion gear 165 engaging the rack 138. The linking arm rack 138 is held in alignment with pinion gear 165 by linking arm guides 41 and 42 carried by frame portion 40. Upward and downward motion of arm 136 is thus translated by the rack 138 and pinion gear 165 into rotation of the shaft potentiometer 164 to vary the speed of the motor 161.

The desired amount of dough accumulation when the apparatus is in operating equilibrium is determined by the linkage pivot 139 and by the length adjusting means 137. The amount of dough accumulation determines the amount of compression exerted upon the dough when in the dividing drum 211. The linkage pivot 139 and the length adjusting means 137 control the dough accumulation by controlling the effective length of the arm 136 which, in turn, determines the range of movement of the sensor roller 140 when in contact with the dough.

The length of the arm 136 is incrementally changed depending upon into which of the holes 139' the free end 135 of the lever arm 131 is inserted. Similarly, the length of the arm 136 is infinitely varied by the amount the adjusting means 137 is screwed into the rack 138. Thus, the linkage pivot 139 and the length adjusting means 137 respectively provide a coarse and a fine adjustment the length of the arm 136 and thus of the range of movement of the sensor roller 140 as it follows the dough.

The permissible range of movement of the sensor roller 140 determines the degree to which the speed of the motor 160 can be increased or decreased and thus determines how much dough is accumulated under the sensor roller 140 prior to being compressed into the dividing drum 211. By ensuring the approximate same amount of dough at all times under the sensor roller 140, the dough will be uniformly compressed into the dividing drum 211.

The operation of the sensor means 130 is thus as follows. An upward displacement of the sensor roller 140 in response to accumulation of dough past the horizontal rollers 121 and 122 causes upward motion of roller follower 133 which produces a magnified and substantially upward motion of free end 135 of lever arm 131 by rotation thereof about the lever arm pivot 132. This upward motion of free end 135 produces an upward motion of sensor linking arm 136 and linking arm rack 138. The linking arm rack 138 interacts with potentiometer pinion gear 165 to translate the upward motion of sensor linking arm 136 into rotational motion of the potentiometer shaft 164 to cause the potentiometer to reduce the electrical power supplied to motor 161 by the electrical connecting means 163. This reduction in power supply results in a reduction in the rate of rotation of the motor shaft 162, which reduces the rate of rotation of the horizontal rollers 121 and 122, thereby preventing the accumulation from increasing.

The elimination of the dough build-up will eventually result in a downward motion of infeed sensor roller 140. This will reverse the above sequence to produce an increase in the rate of rotation of the rollers 121 and 122 to increase the rate at which dough is supplied to the dividing drum 211.

FIG. 13 shows an alternative embodiment of a portion of the sensor means 130. The alternative embodiment includes photoelectric means 180 having a light beam source 181 mounted to one side of the frame, a light beam sensor 182 mounted to an opposite side of the frame. Light is emitted by the source 181 and selectively occluded by upward motion of the sensor roller 140 in response to build-up of dough past the horizontal rollers 121 and 122. The light beam sensor 182 communicates with the motor 161 such that the rate of rotation of the motor 161 varies in response to the dough accumulation.

2. The Dividing Portion

The second or dividing portion 200 of the apparatus separates the slab of dough 52 having uniform width and depth into multiple strips 53 of uniform cross-section. Referring particularly to FIGS. 3 and 4, the dividing portion includes a cylindrical dividing drum 211 having first and second dough pockets 220 and 230 extending circumferentially thereabout. The dividing drum 211 is carried by a shaft 214 rotatably journaled to the frame.

The dough pockets 220 and 230 are each defined by generally U-shaped drum channels 221 and 231 in cooperation with dough container plates 201 and 202, as shown in FIG. 4. These plates are removable to allow cleaning of the machine and form a confining lateral barrier for the dough slab 52 during the division thereof. The channels 221 and 231 thus have cylindrical floors 222 and 232, axially inward sidewalls 223 and 233, respectively, and axially outward sidewalls 224 and 234, which define circumferentially-extending channels having a uniform and substantailly square cross-section.

Cooperating with the dividing drum 211 are a plurality of horizontal compression rollers 151, 152 and 153. These rollers 151, 152 and 153 extend laterally across the outer surface of dividing drum 211. Each of the compression rollers 151, 152 and 153 are respectively journalled to shafts 154, 155 and 156. The outer rollers 151 and 153 are driven by gear means 158 engaging a gear 241 on the drum shaft 214, while the middle roller 152 is driven with a short chain 159 engaging a pair of sprockets extending from shafts 155 and 156. As shown in FIG. 11, the dough-engaging cylindrical surfaces of each of the compression rollers 151, 152 and 153 include axially-aligned and laterally-extending grooves 159 to facilitate conformance of the dough to the shape of the dough pockets 212 and 213 in dividing drum 211 by minimizing surface resistance to axial and lateral flow of the dough.

The axially inward sidewalls 223 and 233 define a circular cutting edge 240, which divides the dough slab 52 into two strips 53. Further, the compression rollers 151, 152 and 153 cooperate with the drum channel 221 and 231 to form the dough into strips 53 having a uniform cross-section substantially of the shape of the dough pockets 220 and 230.

A second motor means 250 rotates the dividing drum 211 and the compression rollers 151, 152 and 153 at a predetermined rate independent of the rate of rotation of the portion forming 100. The second motor means includes a motor 251 having a shaft 252 driving a V-belt 269 connected to driving sheave 262, whose speed may be manually adjusted. The sheave drives a gear reduction means 261 connected by a shaft 263 and sprocket 264 to drive chain 267. The chain 261 is connected to a large sprocket 265 supporting a smaller sprocket 270 connected by another drive chain 272 to the driving gear 271 for the dividing drum 211. The chain drive 159 is also coupled to this arrangement, whereby the motor 260 turns the dividing drum 211 and the compression rollers 151, 152, and 153 in a coordinated manner with a constant velocity irrespective of load resistance to effect the division of the slab 52 into the plurality of strips 53.

The weight of the dough elements produced by the present invention is determined by the rotational speed of the dividing drum 211. To change the weight of each of the elements produced with this invention, it is only necessary to change the speed of the drum 211. This is accomplished by the use of a variable speed motor as the second motor means 250, or by the use of the variable pitch sheaves 261 and 262.

In an series of alternative embodiments shown in FIGS. 14 through 19, the dividing drum 211 is laterally expanded through the use of drum channel segments 280 to provide an increased number of strips 53. The drum channel segments 280 are each provided with a bore 282 whereby the segments 280 may be positioned on the drum shaft 214. Drum channel end segments 285 and 286 are used with the drum channel segments 280 to provide axial walls for the drum 211 formed with the segments.

3. The Cutting Portion

The third or cutting portion 300 cuts the strips of dough 53 produced by the dividing portion 200 into rectangular or cubic solid chunks of dough 54 with a plurality of cutting blades 350 driven in a planetary fashion at constant speed. The blades 350 are moved in a direction generally perpendicular to the direction of travel of the dough strips 53 so as to minimize longitudinal motion of the blade in relative to the strips as they are cut therewith. Accordingly, dough working is minimized during the cutting operation.

In the preferred embodiment, two cutting blades 350 are utilized, each mounted to a blade bar 340. The cutting blade bars 340 are each rotatably mounted by planetary arms 320 and 321 attached to a shaft 311 rotatably journalled to the frame. Each blade 350 has a generally U-shaped cutting edge 351 beveled to a sharp knife-like cutting blade surface. The cutting edge 351 is specifically configured to conform with the cross-sectional shape of channels 216 and 217 such that the cutting blades 350 can selectively occlude dough pockets 212 and 213 to cut a strip of dough 53 within the pockets into multiple chunks 54. The blades 350 mount to the arms 340 by mounting screws 354 and threaded holes 355 which receive the mounting screws 354. A pair of set screws are also provided in blade bar 340 to adjust the protruding length of the blade 350 to determine the occlusion clearance between each blade 350 and its respective pocket 212 or 213.

Planetary driving means 330 maintains the cutting blade bars 340 and the cutting blades 350 in a constant angular position relative to frame 10. As shown in FIGS. 9 and 10, the planetary arms 320 and 321 are carried by shafts 341 and 342 journaled upon bar shaft bearings 344. Rotation of the shaft 311 relative to the frame 10 causes circular movement of the planetary arms 320 and 321 about the axis of rotation of the shaft 311.

The planetary mechanism also includes a planetary mechanism housing 331 enclosing a planetary gear drive. The gear drive includes a gear 346 at the end of each shaft 341 meshing with an idler gear 332 attached to the arm 320. The idler gears 332 mesh with a gear 318 attached to a support tube 316, which is press-fit onto journal bearing 315 rotatably mounted about the shaft 311. The gear 318, which is shown in FIG. 9 as being integral with the tube 316, may be a separate part that is pressfit and pinned to the tube 316 to make it operate as an integral unit therewith.

The shaft 311 drives the arms 320 and 321 by means of keys 314. The tube 316 is mounted to the apparatus by a clamping cylinder 317 (FIG. 2) which is fixed to the sidewall 21. The gear 318 is then held stationary as the planetary gears are rotated around it in response to the rotation of the shaft 311. Thus, parts 315, 316, and 318 are fixedly held to the frame sidewall 21 to produce the planetary motion of the blades as the shaft 311 rotates. The gears 318, 332, and gear 346 have a 1:1 ratio to maintain cutting blade bars 340 in a constant angular position relative to frame 10 during orbiting motion about the shaft 311. Accordingly, the cutting blades are cut the dough strips 350 with a motion perpendicular to the direction of movement of the strips to minimize dough working.

The cutting portion 300 includes a third means 360 having a motor 361 and in-line reducer means rotating a shaft 362 and sprocket 371 fixedly attached thereto. A chain 372 connects the sprocket 371 to another sprocket 373 attached to planetary shaft 311. The blades 350 are rotated at a constant speed as selected by the setting of the motor 361 to produce the desired number of dough pieces per hour. As discussed previously, the weight of each piece is determined by the rotational speed of the dividing drum, which effects the longitudinal dimension of each of the resulting dough elements.

In the preferred embodiment of the cutting portion 300, two cutting blades 350 are provided, one for each cutting blade bar 340, whereby the blades 350 alternately occlude the first and second pockets 212 and 213. In an alternative embodiment of the cutting portion shown in FIGS. 14 and 15, four cutting blades bars 340 each carry two cutting blades 350 such that rotation of the first and second planetary arms 320 and 321 causes the blades 350 to alternately occlude the first and third pockets of dividing drum 211 and the second and fourth pockets. In this manner, two pairs of dough elements are produced with each rotation of the arms 320 and 321.

Figure 17:
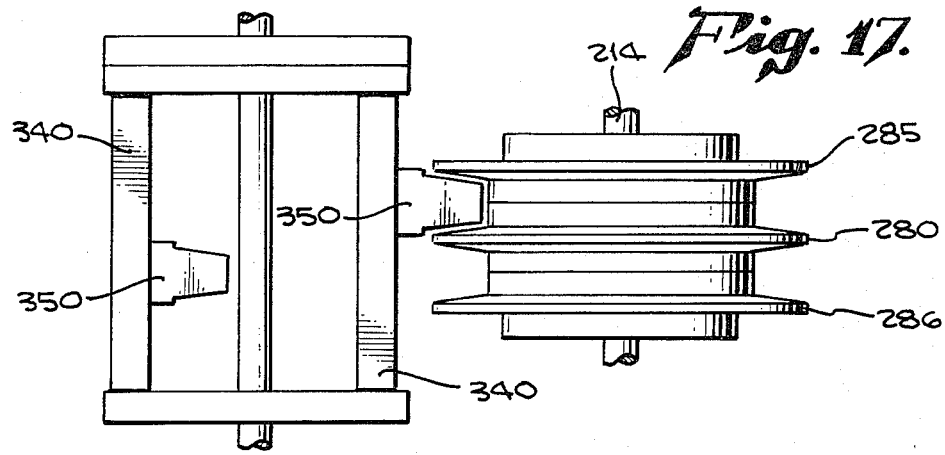
FIGS. 17-19 show plan views of three alternate embodiments of the dividing and cutting portions of the present apparatus, the embodiments allowing the production of rectangular or cubic dough elements at different rates.
Figure 18:
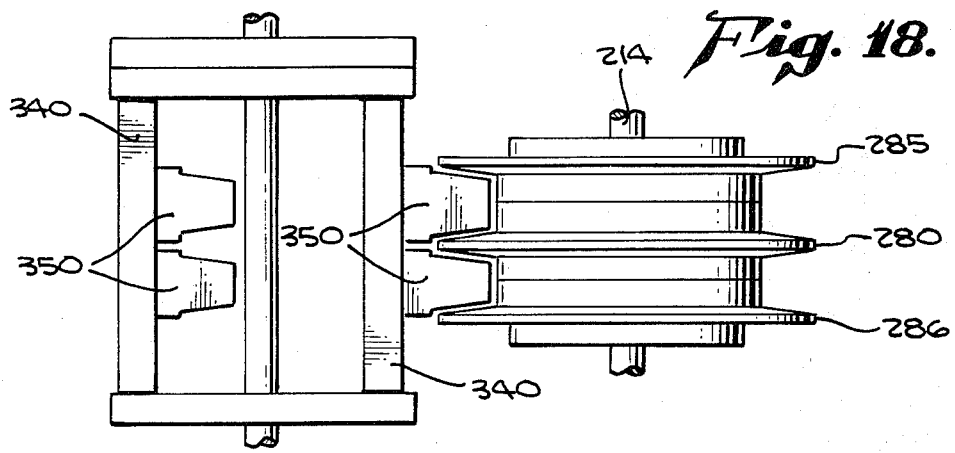
Figure 19:
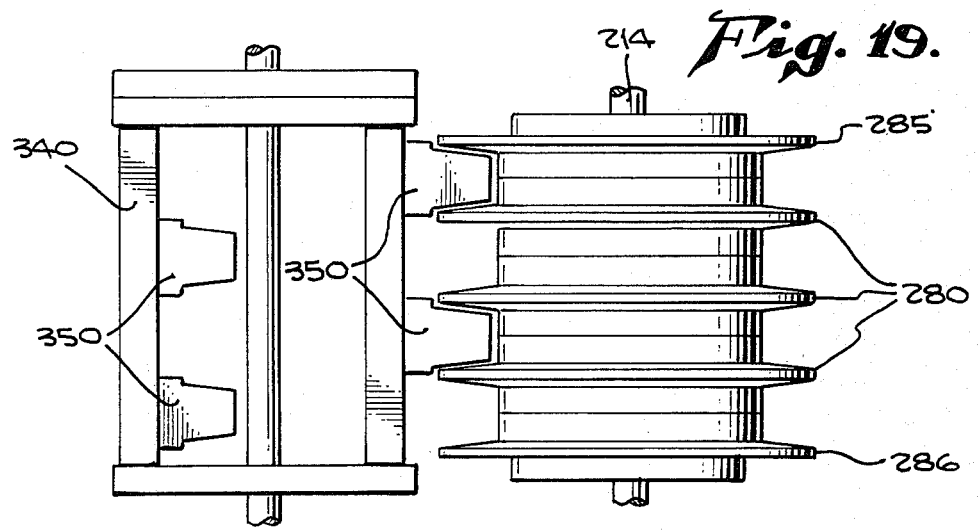

Alternative embodiments of the cutting portion 300 also shown in FIGS. 17-19 in conjunction with the alternate embodiments of the dividing portion 200. These embodiments show various other arrangements of the cutting blade bar 340, cutting blade 350, and drum segments 280 to achieve different rates of production of the rectangular or cubic dough elements 54. Referring to FIG. 17, three of the drum segments are provided, along with two blade bars 340, each of which mount one blade 350. In this embodiment, the two cutting blades 350 alternately cut the strips of dough passing though the two pockets formed by the three drum segments. This arrangement is capable of production speeds on the order of 150 to 200 dozen per hour. Referring to FIG. 18, three drum segments 280 and two blade bars 340 are provided, with two cutting blades 350 on each of the bars 340 to achieve an increased speeds on the order of 300 dozen per hour. Referring to FIG. 19, five drum segments 280 are provided along with two blade bars 340, with each blade bar 340 having two cutting blades 350 to achieve even greater speeds on the order of 600 dozen per hour.

Referring again to FIG. 1, dough removing means 380 is provided in the cutting portion 300 and includes a dough-removing roller 381 having axially aligned grooves 382. The dough-removing roller 381, as shown in FIG. 6, is fixedly attached to a shaft 383 journaled to the frame by bearings 384 and 385. A sprocket 387 attached to the shaft 383 carries a chain 388 engaging a sprocket 386 attached to the planetary gear shaft 311, thereby causing rotation of the dough-removing roller 381 as the planetary arms 320 and 321 rotate.

The dough-removing roller 381 is positioned adjacent the most vertically downward position of rotation of each cutting blade 350 such that the roller 381 removes any dough elements 54 adhering to the lower surface of the blades 350 as shown in FIG. 6. Thus, dough elements 54 drop from the blades 350 in a predetermined region and at a controlled rate such that they are directed to a chute 389 for delivery to a conveyor/proofer apparatus 390, as is known in the art.

The conveyor/proofer 390 is driven at a rate proportional to the rate at which the dough elements 54 are produced. As shown in FIG. 1, the elevator 390 includes a shaft 391 having a sprocket 392 carrying a chain 394 engaging a sprocket 393 on the planetary drive shaft 311. Thus, the proofer 390 operates at a rate proportional to the rate of the cutting of the dough strips 53 into the dough elements 54.

By the foregoing, the forming, dividing, and cutting portions 100, 200, and 300 combine to form a continuous process for the forming, dividing and shaping of an irregular bulk of dough 50 into multiple substantially rectangular dough chunks 54 of a uniform and predetermined weight, volume, and shape with a minimum of dough working.

Having thus described an exemplary embodiment of an improved dough forming, dividing and cutting apparatus according to the present invention as well as several contemplated alternative embodiments, it should be understood by those skilled in the art that various modifications, adaptations and alternative embodiments thereof can be made within the scope of the present invention as defined by the following claims.

What is claimed is:

1. An apparatus for rapidly and continuously shaping an irregular mass of dough into a plurality of individual dough elements of controllable weight, comprising:

forming means for shaping said irregular mass into a continuous dough slab of uniform thickness and width said forming means having an input means for receiving said irregular mass and an output means through which a slab of dough of uniform thickness and width is emitted, said forming means including driven roller means for pulling said irregular mass progressively into said forming means through said input, shaping it into a slab of uniform thickness and width, and emitting it from said output, said forming means further including drive means connected to drive said driven roller means at a changeable rate;

driven dividing drum means revolving at a constant speed for receiving and pulling said slab of dough from said output means and for dividing said slab into a plurality of dough strips of the same uniform cross-sectional area;

sensing means operably connected to said drive means for sensing the thickness of said slab being received by said dividing drum means and for speeding up said drive means when said thickness is too thin and for slowing down said drive means when said thickness gets too thick whereby said thickness is maintained generally constant; and, driven cutting means for continuously dividing said strips into a plurality of individual dough elements of generally equal length with the length of said elements being determined by the operating speed of said cutting means relative to the speed of said dividing drum means.

2. An apparatus as defined in claim 1, wherein said forming means comprises:

first guide-rolling and dough-shaping means normal to the path of movement of said irregular mass for shaping said irregular mass to have a uniform width; and, second guide-rolling and dough-shaping means parallel and traverse to the path of movement of said irregular mass for gripping said mass to draw it into said forming means and for shaping said uniform width dough mass to have a uniform height, said second means including grooves engaging said mass for increasing the amount of surface contact between said second means and said mass to achieve an improved gripping action between said horizontal rolling means and said dough.

3. An apparatus as defined in claim 2, wherein:
said apparatus further comprises a dough receiving chute for supporting said irregualr dough mass;
said first rolling and shaping means comprises a pair of generally cylindrical guide rollers disposed for free rotation adjacent said chute and normal thereto on opposite sides of said mass, whereby said mass is laterally compressed to have a uniform width as said mass passes between said rollers;
said second rolling and shaping means comprises a pair of generally cylindrical infeed rollers disposed parallel and traverse to said chute above and below said mass adjacent said guide rollers and driven by an associated motor, said infeed rollers having a plurality of circumferential dough-receiving grooves, said second rolling and shaping means drawing said dough mass from said chute into said apparatus and past said first rolling and shaping means, with said grooves wedging against said mass to produce a ribbed slab of dough of uniform consistency and weight with a minimum of dough working.

4. An apparatus as defined in claim 1, wherein said dividing means comprises:
shaping and dividing roller means, having a plurality of circumferential grooves of identical cross-section and having cutting edges between said grooves, for receiving said continuous and uniform slab from said forming means; and,
compression roller means, disposed adjacent to and cooperating with said shaping and dividing roller means, for compressing said slab into said grooves to effect said division of said slab into said continuous strips.

5. An apparatus as defined in claim 4, wherein:
said shaping and dividing roller means comprises a driven horizontally disposed multi-grooved dough shaping roller drum with said grooves being substantially square in cross-section and forming circular dough pockets for receiving and dividing said dough slab with a minimum of sheer stress into a plurality of continuous strips of generally square cross-section and uniform weight;
said compression roller means comprises a plurality of horizontally-disposed and ribbed driven cylindrical rollers urging said dough slab from said forming means into said dough pockets, thereby cooperating with said shaping roller to receive said slab from said forming means and to shape said slab into said strips with a minimum of dough working.

6. An apparatus as defined in claim 1, wherein said cutting means comprises:
planetary cutting blade means for continuously cutting through said strips with a motion generally perpendicular to the direction of travel of said strips, thereby dividing said strips into a continuous plurality of dough elements, with the weight of each of said elements determined by the rotational speed of said dividing drum means relative to the speed of said cutting blade means.

7. An apparatus as defined in claim 6, wherein said cutting blade means comprises:
motor means for producing rotational motion;
a plurality of cutting blades;
supporting bar means for mounting said blades;
planetary drive means, coupling said supporting bars to said motor means, for moving said blades in a vertically planetary motion for occlusion with said dividing means at right angles to said strips, whereby said strips are cut perpendicularly by said blades with only a slight pull on said dough, thereby minimizing the working of said dough.

8. An apparatus as defined in claim 1, wherein said apparatus further comprises:
dough collecting means, cooperating with said cutting means, for removing said elements from said cutting means, and for directing said elements to a common collection point.

9. An apparatus as defined in claim 8 wherein said collecting means comprises:
roller means, disposed adjacent said cutting means, for removing said elements from said cutting means; and
collection chute means, disposed adjacent said roller means, for directing said elements toward a common collection point after said removal.

10. An apparatus as defined in claim 1, wherein:
said sensor means comprises sensor roller means, biased against said uniform slab, for detecting an increase in thickness of said slab prior to said dividing and compressing of said slab, and first speed control means, adjustably linked to said sensor roller means and said drive means, for decreasing the rotational speed of said forming means when said sensor roller means detects said thickness increase, thereby allowing said dividing means to dissipate said increase.

11. An apparatus as defined in claim 10, wherein:
said sensor roller means comprises a freely-rotating roller horizontally disposed for contact with said dough slab between said forming means and said dividing means, for arcuate movement in a plane perpendicular to said dough slab in response to accumulation of said dough between said forming means and said dividing means; and linking arms means, supporting said freely rotating roller and connecting said roller to said speed control means, for converting said arcuate movement to a linear movement to control said rotating speed of said forming means;
said drive means is an electric motor; and,
said motor speed control means comprises motor speed potentiometer means, electrically connected to said drive means and mechanically coupled to said linking arm means, for changing the speed of said drive means in inverse relation to said dough accumulation, thereby maintaining a generally uniform dough accumulation adjacent said dividing means.

12. An apparatus as defined in claim 11, wherein:
said linking arm means includes coarse and fine length adjusting means for changing the length of said arm means to establish a range of movement of said sensor roller means and thus a range of the speed of said drive means to maintain a uniform accumulation of dough adjacent said dividing means.

* * * * *